United States Patent [19]
Ravussin et al.

[11] 3,851,974
[45] Dec. 3, 1974

[54] SYSTEM FOR OPTICAL ALIGNMENT AND ADJUSTMENT OF A LASER

[75] Inventors: Pierre-Emile Ravussin, Lausanne; Jean-Pierre Vuille, Epalinges, both of Switzerland

[73] Assignees: OMEGA Louis Brandt & Frere S.A., Biel, Berne; Alcyon Electronique et Physique S.A., Renens, Vaud, both of, Switzerland

[22] Filed: May 7, 1973

[21] Appl. No.: 357,828

[30] Foreign Application Priority Data
May 30, 1972 Switzerland.................. 7959/72

[52] U.S. Cl............................ 356/153, 331/94.5 A
[51] Int. Cl. ........................................ G01b 11/26
[58] Field of Search................. 356/153; 331/94.5 A

[56] References Cited
UNITED STATES PATENTS

| | | | |
|---|---|---|---|
| 3,256,524 | 6/1966 | Stauffer........................ | 219/121 L |
| 3,379,998 | 4/1968 | Soules et al.................. | 331/94.5 A |
| 3,528,748 | 9/1970 | Burch et al................... | 356/153 |
| 3,582,466 | 6/1971 | Quirk........................... | 219/121 LA |
| 3,588,440 | 6/1971 | Morse.......................... | 331/94.5 A |

*Primary Examiner*—Ronald L. Wibert
*Assistant Examiner*—Paul K. Godwin
*Attorney, Agent, or Firm*—Imirie, Smiley & Linn

[57] ABSTRACT

A system for optical alignment and adjustment of a machining laser, wherein an auxiliary laser, which is mounted near the principal laser provides a beam which is directed in superposition with the optical axis of the principal laser to precisely adjust a workpiece with the optical elements of the principal laser.

6 Claims, 1 Drawing Figure

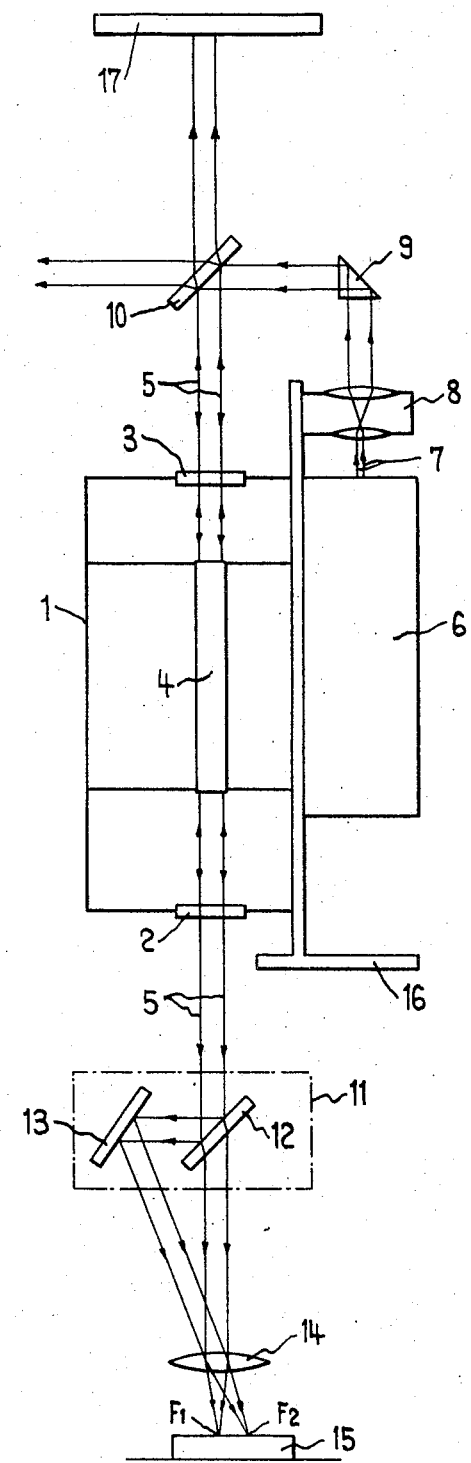

SYSTEM FOR OPTICAL ALIGNMENT AND ADJUSTMENT OF A LASER

BACKGROUND OF THE INVENTION

The present invention refers to a system for optical alignment and adjustment of a machining laser.

There exist numerous devices for alignment and positioning of workpiece relative to the focal point of a machining laser. In order to be able to make observations during the positioning of the workpiece under the same angle as the incident laser beam, the reading or aligning device is generally mounted on the focusing optic, where a beam splitter is brought into the path of the laser beam.

SUMMARY OF THE INVENTION

As mechanical precision is generally not sufficient, it is necessary to position the workpiece after each shot of the laser. This disadvantage can be obviated with the device according to the present invention, wherein an auxiliary laser, which is mounted near the principal machining laser, can send its beam with the aid of appropriate optical means in direct superposition with the optical axis of the principal laser to precisely adjust the workpiece and the optical elements of the machining laser.

The invention will be understood more clearly with the aid of an illustrative embodiment and with the accompanying drawing.

BRIEF DESCRIPTION OF THE DRAWING

The single FIGURE in a diagrammatic plan view of an embodiment of the system according to the present invention.

DESCRIPTION OF THE INVENTION

The device for optical alignment and adjustment of a laser consists of a laserhead 1 with two mirrors 2 and 3 which form a Fabry-Perot-interferometer, the active medium 4, for example ruby or YAG—$Nd^{3+}$, being disposed between the mirrors 2 and 3. Parallel to the optical axis 5 of the machining laser is mounted an auxiliary laser 6, for example a He-Ne-gaslaser, with a small power of about 1 mW. In the optical axis of its beam 7 is a telescope-system 8 to enlarge the beam and a prism 9 which directs the beam onto a beamsplitter 10, which is situated between the laserhead 1 and a screen 17.

It is noted that a part of beam 7 is sent with the aid of beamsplitter 10 exactly along axis 5. A beamsplitting means 11, consisting of beamsplitter 12 and mirror 13 can be interposed between the laserhead and the focusing optic 14, resulting in two focal points $F_1$ and $F_2$ on workpiece 15, which allows machining simultaneously at two points.

The base 16 serves as support for both the machining and the auxiliary laser.

It is further noted that due to its narrow bandwidth the dielectric mirror 3 has a reflectivity of nearly 100 percent for the wavelength of the machining laser, for instance 694.3 nm, whereas it is much more transparent for the wavelength of the He-Ne-gaslaser, which is 632.0 nm.

The operation of the system is as follows.

The beam 7 from gas-laser 6 passes through the telescope 8 and is directed by prism 9 on the beamsplitter 10 and is exactly aligned along axis 5 of the machining laser. The beam thus passes through beam-splitting means 11 and focusing optic 14 to the two focal points $F_1$ and $F_2$ on workpiece 15. With the aid of the device 11 it is possible to vary the distance between $F_1$ and $F_2$. After positionning the workpiece exactly relative to the two focal points, the main or machining laser can be switched on and the machining can be executed without further preparations.

The optical and mechanical alignment of the machining laser itself can also be done with the aid of the gas-laser in the present system, since the exact alignment of the two mirrors 2 and 3 can be obtained with the aid of screen 17, where the beam from the gaslaser, which is reflected by the mirrors, is superposed thereon.

The system further provides for the focusing of the laser beam by the optic 14, which can be a microscope objective, with the distance between $F_1$ and $F_2$ varying with the focusing. In another embodiment, it is possible to bring laser 6 directly in the optical axis of the machining laser.

What is claimed is:

1. A system for optical alignment and adjustment of a machining laser comprising
   a base member,
   a machining laser and an auxiliary, alignment laser fixedly mounted on said base member, and
   means directing the output beam of said auxiliary laser through the active element of said machining laser in super-position with the output beam of said machining laser whereby alignment of a workpiece with respect to said auxiliary laser beam accurately determines the point of application of said machining laser beam.

2. The system according to claim 1 wherein said auxiliary laser is a gas laser having telescope means to enlarge the output beam therefrom to the diameter of said machining laser beam.

3. The system according to claim 1 wherein said machining laser includes a mirror upon which said auxiliary laser beam is incident, said mirror having a high reflectivity for said machining laser beam and a low reflectivity for said auxiliary laser beam.

4. The system according to claim 1 further including beamsplitting means at the output of said machining and auxiliary lasers for directing plural beams through a focusing optic means to adjust the focal points of the divided beam.

5. The system according to claim 1 wherein said auxiliary laser is mounted in parallel with said machining laser on said base member.

6. The system according to claim 1 wherein said means directing said auxiliary laser output beam comprises a beam-splitter disposed between said auxiliary and machining lasers to enable superposition of the output beams thereof and accurate alignment of the machining laser mirrors.

* * * * *